United States Patent
Kane et al.

(10) Patent No.: US 9,248,818 B2
(45) Date of Patent: Feb. 2, 2016

(54) SEAL

(75) Inventors: Brian Kane, Lohr am Main (DE); Chris Shrive, Stirling (GB); Keith McMillan, Edinburgh (GB)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/577,145

(22) PCT Filed: Jan. 21, 2011

(86) PCT No.: PCT/EP2011/000236
§ 371 (c)(1),
(2), (4) Date: Nov. 19, 2012

(87) PCT Pub. No.: WO2011/095281
PCT Pub. Date: Aug. 11, 2011

(65) Prior Publication Data
US 2013/0069318 A1    Mar. 21, 2013

(30) Foreign Application Priority Data

Feb. 5, 2010    (DE) .......................... 10 2010 006 896

(51) Int. Cl.
*F16J 15/32*    (2006.01)
*B60T 17/00*    (2006.01)
*B60T 11/236*    (2006.01)

(52) U.S. Cl.
CPC ............... *B60T 17/00* (2013.01); *B60T 11/236* (2013.01); *F16J 15/3236* (2013.01)

(58) Field of Classification Search
CPC ..... F16J 15/32; F16J 15/3204; F16J 15/3216; F16J 15/3232; F16J 15/3236
USPC .......................... 277/511, 529, 530, 534, 536
See application file for complete search history.

(56) References Cited

U.S. PATENT DOCUMENTS

| | | | |
|---|---|---|---|
| 4,261,583 A * | 4/1981 | de Vries et al. ................ | 277/550 |
| 4,586,718 A | 5/1986 | Stephenson et al. | |
| 5,140,904 A * | 8/1992 | Schonlau .......................... | 92/27 |
| 5,265,890 A * | 11/1993 | Balsells ......................... | 277/467 |
| 5,667,040 A * | 9/1997 | Samulak et al. ................ | 188/52 |
| 5,975,538 A * | 11/1999 | Krause et al. .................. | 277/551 |
| 6,405,837 B1 * | 6/2002 | Muramoto .................... | 188/72.5 |

(Continued)

FOREIGN PATENT DOCUMENTS

| | | |
|---|---|---|
| DE | 44 23 043 A1 | 1/1996 |
| DE | 10 2005 030 189 A1 | 1/2006 |

OTHER PUBLICATIONS

International Search Report corresponding to PCT Application No. PCT/EP2011/000236, mailed Jun. 7, 2011 (German and English language document) (5 pages).

*Primary Examiner* — Gilbert Lee
(74) *Attorney, Agent, or Firm* — Maginot, Moore & Beck LLP

(57) ABSTRACT

A seal between an outer part and a circular cylindrical inner part, which is accommodated within the outer part at least in sections, includes a sealing ring having a groove portion and consisting of high-temperature-resistant thermoplastic plastics material. The outer part and the inner part are movable in a linear manner in relation to each other. A circumferential groove, into which the groove portion of the sealing ring is inserted at least in sections, is realized on an inner circumference of the outer part or on an outer circumference of the inner part. The sealing ring is in one part, and the groove is closed.

14 Claims, 3 Drawing Sheets

(56) References Cited

U.S. PATENT DOCUMENTS

| | | | |
|---|---|---|---|
| 6,454,273 B1* | 9/2002 | Kashima et al. | 277/437 |
| 6,575,471 B1* | 6/2003 | Grosspietsch et al. | 277/436 |
| 6,640,943 B1* | 11/2003 | Daws et al. | 188/322.17 |
| 7,198,275 B2* | 4/2007 | Gravier | 277/438 |
| 2004/0169337 A1* | 9/2004 | Watanabe et al. | 277/375 |
| 2005/0258682 A1* | 11/2005 | Halasy-Wimmer et al. | 303/89 |
| 2006/0237916 A1* | 10/2006 | Peter et al. | 277/438 |
| 2011/0223471 A1* | 9/2011 | Sato et al. | 429/172 |
| 2013/0026714 A1* | 1/2013 | Maeda et al. | 277/589 |

* cited by examiner

SEAL

This application is a 35 U.S.C. §371 National Stage Application of PCT/EP2011/000236, filed on Jan. 21, 2011, which claims the benefit of priority to Serial No. DE 10 2010 006 896.9, filed on Feb. 5, 2010 in Germany, the disclosures of which are incorporated herein by reference in their entirety.

The disclosure relates to a seal as described herein.

BACKGROUND

There are various approaches for seals of circular cylindrical sealing regions with sealing rings which are inserted into a circumferential groove of either a circular cylindrical inner part or of an outer part which is linearly movable in relation thereto.

In this case, closed and open grooves in which a sealing ring is accommodated in sections and in this way is fixed are known. The advantage of closed grooves is that expenditure on the production thereof is comparatively low and the disadvantage is that the sealing ring has to have a certain elasticity in order to be insertable into the groove. Sealing rings with less elasticity and higher temperature resistance can also be inserted into open grooves. A disadvantage of these types of seals is that expenditure on the production of the groove is higher as, once the sealing ring has been inserted, said groove has to be closed laterally by an additional part which is pushed on in the axial direction.

In addition, two-part sealing rings, which have a steel supporting ring into which a seal made of an elastomer is inserted, are also known for temperature-resistant seals. As a result of the low elasticity thereof, the supporting ring has to be inserted into an open groove which has to be closed laterally by a holding ring or locking ring.

In contrast, the object underlying the disclosure is to create a seal for parts which are moved in a linear manner, which provides a comparatively high temperature resistance with a low amount of expenditure on technical construction.

This object is achieved by a seal as described herein.

SUMMARY

The seal according to the disclosure is arranged between an outer part and a circular cylindrical inner part, which is accommodated within said outer part at least in sections, wherein the two parts are movable in a linear manner in relation to each other. A circumferential groove, into which a one-part sealing ring is inserted in sections, is realized on an inner circumference of the outer part or on an outer circumference of the inner part. The sealing ring consists of a high-temperature-resistant thermoplastic plastics material and the groove is closed. The seal according to the disclosure for parts moved in a linear manner consequently has a comparatively high temperature resistance with a low amount of expenditure on technical construction as the sealing ring is in one piece and is able to be inserted directly into the groove, the groove not having to be closed laterally by an additional part.

Further advantageous developments of the disclosure are described herein.

In the case of a particularly preferred further development, the sealing ring consists of polyphenylene sulfide. Consequently, pressure means of a higher temperature (e.g. 180° C.) are able to be sealed off permanently by the seal or by the sealing ring.

In the case of a particularly preferred further development of the seal, the groove is formed on the inner circumference of the outer part. In this case, an elastic abutment against the inner part and good sealing is provided when the sealing ring has a sealing portion, the inside surface of which has two conical portions, from which a sealing lip is realized. Consequently, the sealing properties of the seal according to the disclosure are further improved.

In the case of a preferred further development of the seal, the groove portion of the sealing ring and the groove of the outer part have an approximately rectangular cross section, wherein their respective axial dimension is greater in each case than their respective radial dimension. Consequently, insertion of the groove portion into the groove is made possible by compressing the sealing ring in a moderate manner, and afterwards a secure hold of the sealing ring on the outer part is provided.

The sealing ring can have a main portion on which the groove portion is preferably placed in position by means of an approximately tubular elastic portion. This means that it is easier to compress the sealing ring elastically to insert the groove portion thereof into the groove.

In the case of a preferred application of the seal according to the disclosure, the outer part is a hydraulic cylinder and the inner part is a piston rod.

In the case of another preferred application of the seal according to the disclosure, the outer part is a housing of a self-locking parking brake and the inner part is a brake piston or part of a brake piston. The parking brake is releasable by means of impingement with a pressure means. When the pressure means are released, the brake piston is clamped by means of a cup spring against a plate stack. In this case, the high level of thermal stability of the sealing ring is extremely useful as in the event of emergency braking caused by a fall in pressure in the parking brake, a large amount of heat is generated through friction by the plate stack which is arranged in the direct vicinity of the sealing ring.

It is preferred when a support ring is arranged between the housing and the inner part and between the plate stack and the main portion. Said support ring supports the sealing ring against the pressure of the pressure means used to release the brake.

When the support ring is reinforced by glass fibers, the coefficient of thermal stability thereof is lower than that of the sealing ring.

BRIEF DESCRIPTION OF THE DRAWINGS

An exemplary embodiment of the disclosure is described below in detail by way of the figures, in which.

DETAILED DESCRIPTION

Figure 1:
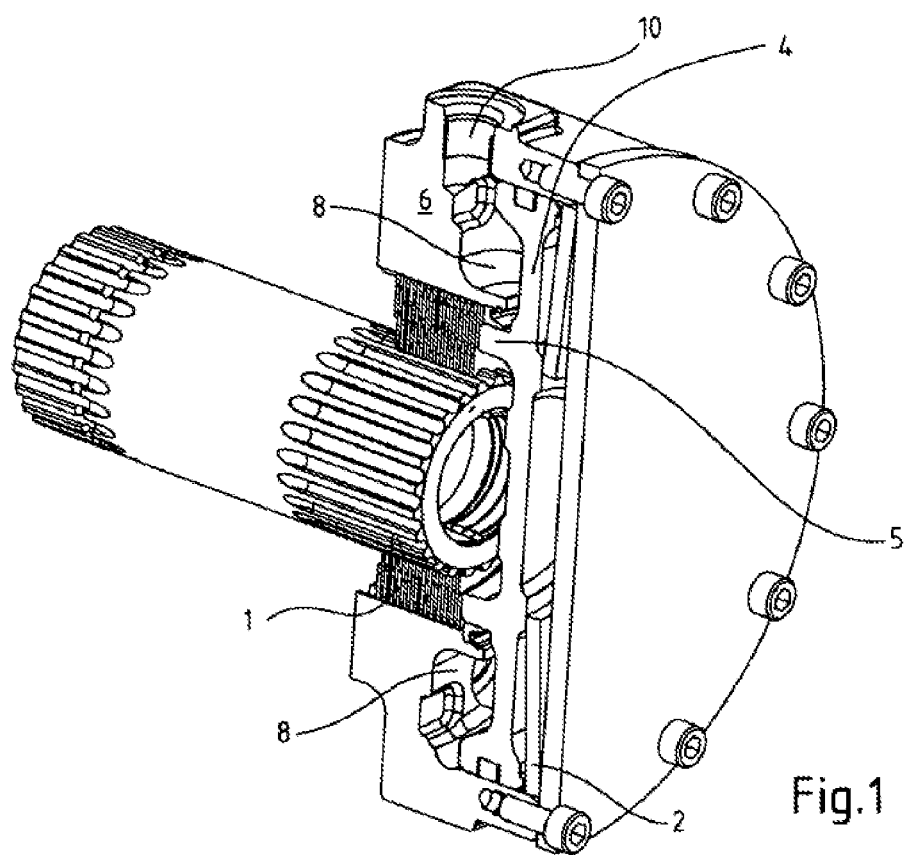
FIG. 1 shows a sectional representation in perspective of a first exemplary embodiment of a seal according to the disclosure in a parking brake.

FIG. 1 shows a sectional view in perspective of an exemplary embodiment of a seal according to the disclosure in a self-locking parking brake. The parking brake is arranged in a wheel hub of an excavator (not shown) and has a plate stack 1 which is acted upon with a contact rest force to the left (in FIG. 1) by a cup spring 2 by means of a brake piston 4. In this case, an approximately tubular contact portion 5 of the brake piston 4 abuts against the plate stack 1. Said contact force causes the plates of the plate stack 1 to be frictionally connected to a housing 6, and the parking brake is moved into action or is activated.

A pressure chamber 8 is provided in the housing 6, it being possible for said pressure chamber to be acted upon with pressure means by means of a channel 10. The pressure chamber 8 is ring-shaped and is realized substantially concentrically with respect to the parking brake, it being defined on the right-hand side thereof (in FIG. 1) by the brake piston 4.

For releasing the self-locking parking brake, the pressure chamber 8 is acted upon with pressure means by means of the channel 10, as a result of which the brake piston 4 is moved to the right (in FIG. 1) against the force of the cup spring 2. The plate stack 1 is consequently relieved and the brake released.

Figure 2:
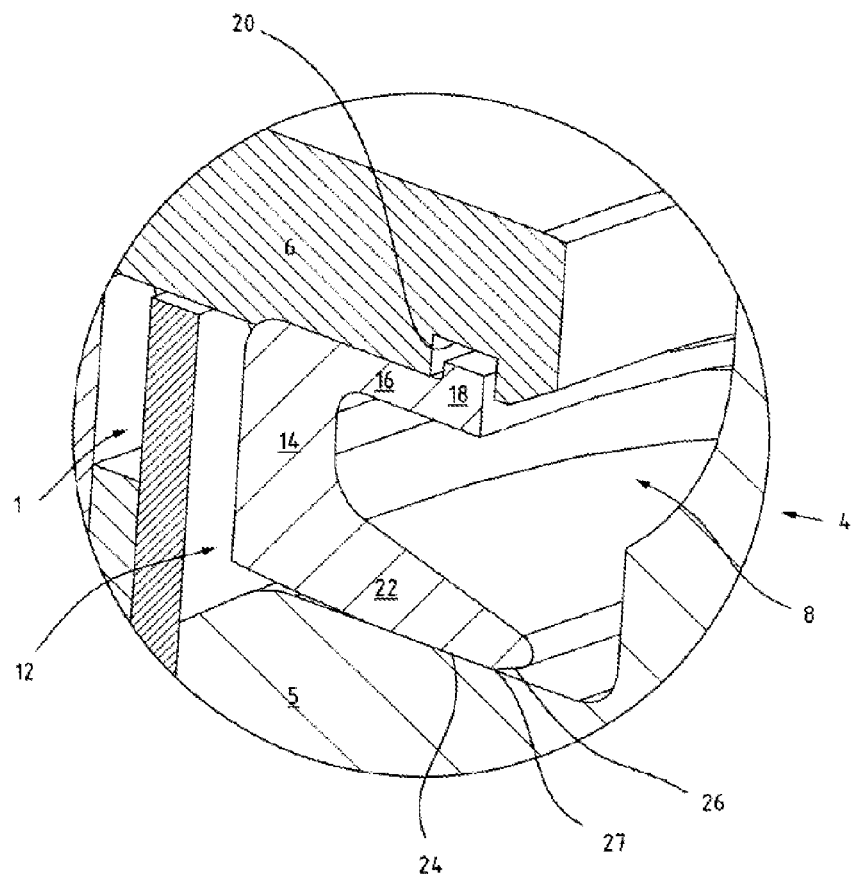
FIG. 2 shows a sectional representation of a detail of the exemplary embodiment according to FIG. 1.

FIG. 2 shows a sectional representation of a detail of the exemplary embodiment according to FIG. 1 with a seal according to the disclosure. It has a sealing ring 12 which consists of one part made of high-temperature-resistant thermoplastic plastics material. Said sealing ring is arranged in a radial recess of the housing 6 and abuts against the brake piston 4. In this case, it seals off the pressure chamber 8 with respect to the surrounding area.

As has been explained with reference to FIG. 1, the contact portion 5 of the brake piston 4 is moved according to the double arrow in relation to the housing 6 and to the sealing ring 12. The sealing ring 12 has a substantially ring-shaped main portion 14, to which a groove portion 18 is fastened by means of an approximately tubular elastic portion 16. Said groove portion is ring-shaped and is inserted into a circumferential groove 20 of the housing 6 by way of its outer portion. The groove 20 is arranged on an outer circumference of the radial recess of the housing 6.

In addition, the sealing ring 12 has a sealing portion 22, which is also fastened to the main portion 14 and has two conical portions 24, 26 on the inner side thereof facing the brake piston 4. Said conical portions are set in an inclined manner with respect to the outer surface of the contact portion 5 of the brake piston 4 such that a ring, which abuts against the contact portion 5, is produced between the conical portions 24, 26.

When assembling the sealing ring 12, the main portion 14 thereof is inserted into the housing 6, the diameter of the groove portion 18 and of the right-hand portion (in FIG. 2) of the elastic portion 16 being reduced until the groove portion 18 locks into or snaps into the groove 20. In this case, the groove 20 is closed according to the disclosure such that no additional housing part is required for the formation of the same.

Figure 3:
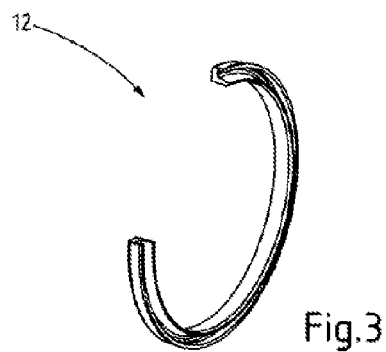
FIG. 3 shows a perspective view of the sealing ring of the exemplary embodiment according to FIG. 1.

FIG. 3 shows a perspective view of the one-piece sealing ring 12 according to the disclosure.

Figure 4:
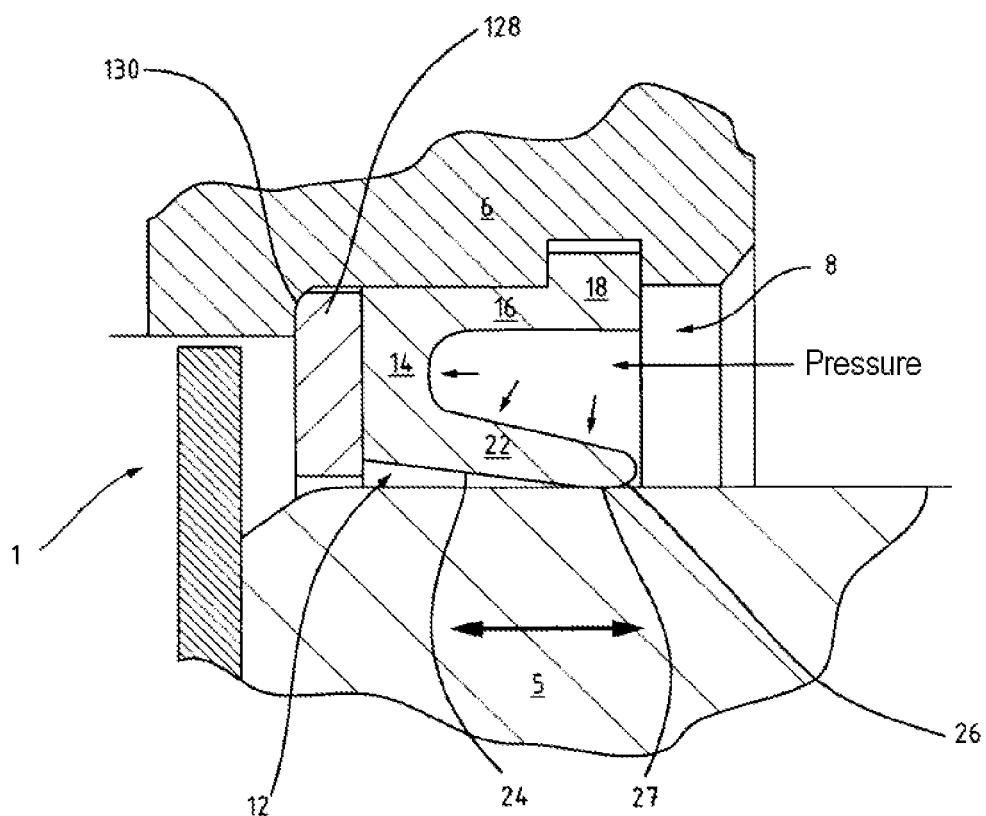
FIG. 4 shows a sectional representation of a second exemplary embodiment of a seal according to the disclosure in a parking brake.

FIG. 4 shows a sectional representation of a second exemplary embodiment of a seal according to the disclosure for a parking brake. Said exemplary embodiment has an additional support ring 128 which is arranged between the housing 6 and the contact portion 5. When viewed in the direction of displacement of the contact portion 5, the support ring 128 is arranged between the plate stack 1 and the main portion 14 of the sealing ring 12.

The additional support ring 128 is reinforced by glass fibers and serves for the mechanical support of the sealing ring 12 against the pressure of the pressure chamber 8, symbolized by the arrows. The support can be necessary, in particular, when said sealing ring 12 has been heated up to 180° C. The support ring 128, in this case, shows a coefficient of expansion which is reduced in relation to the sealing ring 12.

For this purpose, the sealing ring 12, by way of the side thereof of the main portion 14 remote from the pressure chamber 8, abuts against the support ring 128 which, in its turn, is supported on the housing 6 by means of a rounded region with an outer seal 130.

Disclosed is a seal which is arranged between an outer part and a circular cylindrical inner part, which is accommodated within said outer part at least in sections, wherein the two parts are movable in a linear manner in relation to each other. A circumferential groove, into which a sealing ring is inserted at least in sections, is realized on an inner circumference of the outer part or on an outer circumference of the inner part. In this case, the one-part sealing ring consists of a high-temperature-resistant thermoplastic plastics material, and the groove is closed.

The invention claimed is:

1. A seal for use in a parking brake which is releasable by pressure means in which the parking brake includes an outer part in the form of or part of a housing and an inner part that is a brake piston or is fastened to a brake piston operably disposed within the housing, the brake piston configured to be prestressed against a plate stack within the housing by a spring, wherein the outer part and the inner part are movable in a linear manner in relation to each other, the seal disposed between the outer part and the inner part, which is accommodated within the outer part at least in sections, the seal comprising:
   a one piece sealing ring composed of a high-temperature-resistant thermoplastic material, the sealing ring having an open U-shaped profile including a main portion and two elongated legs extending from said main portion to define the U-shaped profile, one of said legs including a groove portion at an end of the leg opposite the main portion, and the other of said legs including a sealing portion configured as a sealing lip; and
   a closed circumferential groove, sized and configured to receive only the groove portion of the sealing ring inserted therein at least in sections, defined in an inner circumference of the outer part or defined in an outer circumference of the inner part, wherein the circumferential groove and the other of the outer part or the inner part translate linearly in relation to each other.

2. The seal as claimed in claim 1, wherein the sealing ring is composed of polyphenylene sulfide.

3. The seal as claimed in claim 1, wherein:
   the groove is formed on the inner circumference of the outer part, and
   the inside surface of the sealing portion of the sealing ring has two conical portions defining the sealing lip, the conical portions forming one leg of the U-shaped profile.

4. The seal of claim 3, wherein the U-shaped profile of said sealing ring is open toward the brake piston and said two conical portions are angled radially outward away from said brake piston and toward the main portion in relation to the outer circumference of the inner part.

5. The seal as claimed in claim 1, wherein:
   the groove portion and the groove each have a generally rectangular cross section, and
   a respective axial dimension of the groove portion and the groove is greater than a respective radial dimension of the groove portion and the groove.

6. The seal as claimed in claim 5, wherein the axial dimensions of the groove portion and the groove are configured for snap fit engagement of the groove portion within the groove.

7. The seal as claimed in claim 5, wherein the sealing ring includes:
   a main portion extending radially between said groove portion and said sealing portion; and
   a tubular elastic portion connecting said groove portion to said main portion, the tubular elastic portion forming one leg of the U-shaped sealing ring.

8. The seal as claimed in claim 7, further comprising a support ring arranged between the housing and the inner part and between the plate stack and the main portion of said sealing ring.

9. The seal as claimed in claim 8, wherein the support ring is reinforced by glass fibers.

10. A seal for use in a parking brake which is releasable by pressure means, the seal comprising:
    a one piece sealing ring composed of a high-temperature-resistant thermoplastic material, the sealing ring including;
    an open U-shaped profile including a main portion and two elongated legs extending from said main portion to define the U-shaped profile, one of said legs including a groove portion at an end of the leg opposite the main portion, and the other of said legs including a sealing portion configured as a sealing lip;
    the main portion extending radially between said groove portion and said sealing portion; and
    said one of said legs formed by a tubular elastic portion connecting said groove portion to said main portion,
    wherein only the groove portion of the sealing ring is configured to be inserted at least in sections into a circumferential groove of a part of the parking brake.

11. The seal as claimed in claim 10, wherein the sealing ring is composed of polyphenylene sulfide.

12. The seal as claimed in claim 10, wherein the groove is formed on the inner circumference of the part of the parking brake, and the inside surface of the sealing portion of the sealing ring has two conical portions defining the sealing lip, the conical portions forming one leg of the U-shaped profile.

13. The seal as claimed in claim 10, wherein the groove portion and the groove each have a generally rectangular cross section, and a respective axial dimension of the groove portion and the groove is greater than a respective radial dimension of the groove portion and the groove.

14. The seal as claimed in claim 13, wherein the axial dimensions of the groove portion and the groove are configured for snap fit engagement of the groove portion within the groove.

\* \* \* \* \*